United States Patent [19]

Mieczkowski

[11] Patent Number: 4,966,262
[45] Date of Patent: Oct. 30, 1990

[54] TRANSMISSION SAFETY LOCKING LEVER APPARATUS

[76] Inventor: Walter L. Mieczkowski, 33611 Curcio Dr., Sterling Heights, Mich. 48310

[21] Appl. No.: 380,308

[22] Filed: Jul. 17, 1989

[51] Int. Cl.[5] .............................................. B60K 41/26
[52] U.S. Cl. .................................. 192/4 A; 192/4 C; 74/850
[58] Field of Search ................. 192/4 A, 4 C, 9; 74/483 R, 483 K, 850; 180/271, 336

[56] References Cited

U.S. PATENT DOCUMENTS

| | | | |
|---|---|---|---|
| 2,426,365 | 8/1947 | Matlock | 192/4 C |
| 2,890,581 | 6/1959 | Lewis | 70/248 |
| 3,169,616 | 2/1965 | Hunsaker et al. | 192/4 C |
| 3,942,614 | 3/1976 | Thompson | 192/4 A |
| 4,096,930 | 6/1978 | Viscardi | 192/4 A |
| 4,473,141 | 9/1984 | Mochida | 74/850 |
| 4,485,694 | 12/1984 | Mochida | 74/850 |
| 4,530,426 | 7/1985 | Mylander | 192/4 A |
| 4,572,340 | 2/1986 | Pierce | 192/4 C |

FOREIGN PATENT DOCUMENTS 246353 11/1987 European Pat. Off. ............ 180/336

Primary Examiner—Leslie A. Braun
Assistant Examiner—Andrea Pitts
Attorney, Agent, or Firm—Basile and Hanlon

[57] ABSTRACT

A transmission safety locking lever apparatus prevents a transmission from being shifted from park or neutral into either drive or reverse unless the vehicle brakes are applied. The apparatus includes first and second spaced apertures formed in a gear shift lever connected to the gear shift shaft coupled to and extending from the transmission. A lock pin movable between extended and retracted positions is biased to the extended position to engage one of the first and second apertures in the gear shift lever when the transmission is in either park or neutral. An actuator retracts the lock pin to enable the transmission to be shifted to any gear position from park or neutral only when the vehicle brakes are applied. A sensor is provided for detecting the application of the vehicle brakes via a predetermined pressure in the vehicle brake system. Electric current is applied to the actuator to activate the actuator when the pressure sensor detects a predetermined pressure in the vehicle brake system indicating application of the vehicle brakes to retract the lock pin from the gear shift lever.

14 Claims, 2 Drawing Sheets

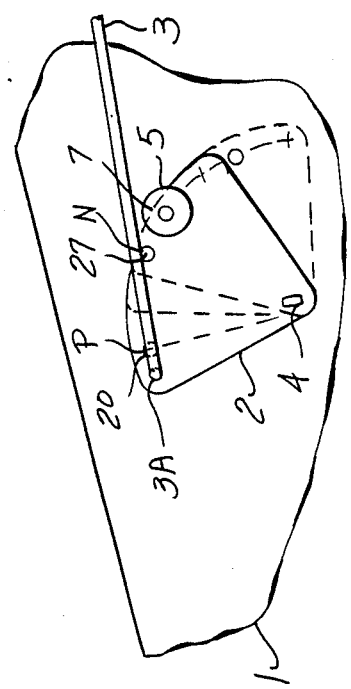
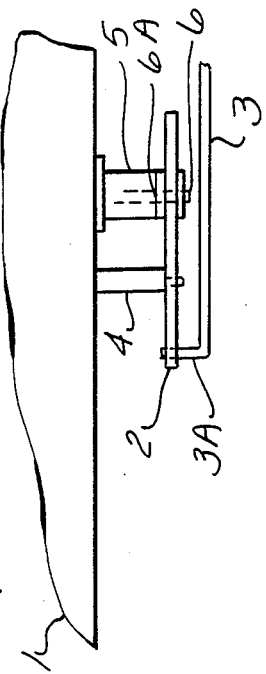
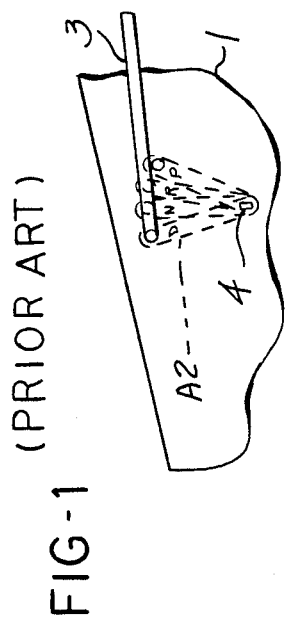
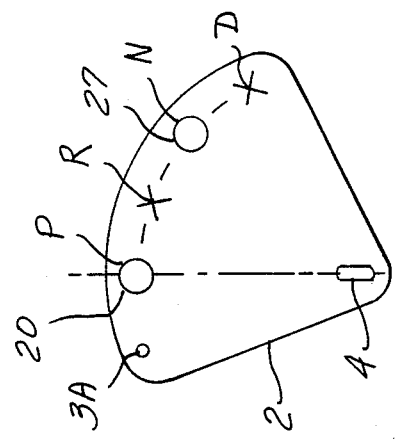
FIG-2
FIG-4
FIG-1 (PRIOR ART)
FIG-3

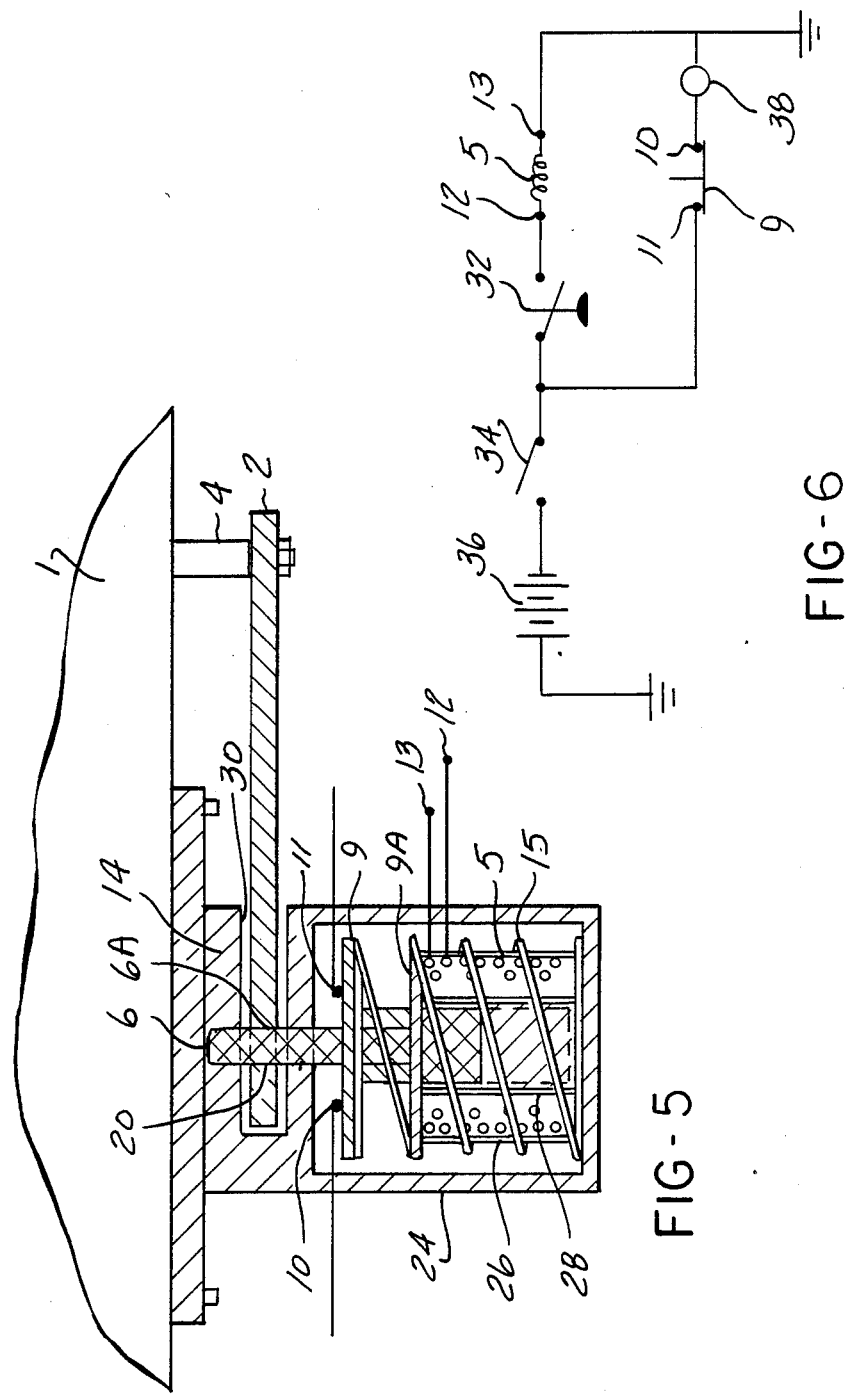

TRANSMISSION SAFETY LOCKING LEVER APPARATUS

BACKGROUND OF THE INVENTION

1. Field of the Invention:

The present invention relates, in general, to vehicle transmission gear shifting mechanisms and, specifically, to transmission safety lock devices which prevent shifting of a transmission until certain predetermined safety-related conditions are met.

In vehicles provided with an automatic transmission, movement of a gear selector in the vehicle into any position of park, reverse, neutral or drive causes the transmission to be shifted through a linkage coupling the gear selector with the transmission into a gear ratio corresponding to park, reverse, neutral or drive. The vehicle engine operates independently of the transmission and can be operated when the transmission is in any of the park, reverse, neutral or drive modes. The operator controls movement of the vehicle in reverse or drive modes through the use of the vehicle accelerator and brake pedals.

However, some vehicle operators occasionally leave the vehicle for a short time with the engine operating and the transmission in park or neutral. When the engine is operating and the vehicle is unattended by an operator, a child can easily move the gear selector into reverse or drive thereby causing movement of the vehicle and creating the potential of property damage and bodily injury to the occupants of the vehicle and pedestrians or bystanders. Furthermore, design deficiencies, misalignment or wear in the transmission or the transmission shifting linkage occasionally causes transmissions to shift into reverse or drive without direct operator intervention. Again, this results in unattended and uncontrolled vehicle movement.

In order to prevent such unattended movement of a vehicle caused by the unintended shifting of the transmission into reverse or drive modes when the engine is running, several safety lock devices have been developed which prevent shifting of the transmission into drive or reverse modes until one or more safety-related conditions are met. Typically, such safety conditions require an intentional action by the operator of the vehicle which is difficult or impossible for a child. Generally, the known transmission safety lock devices employ stops or plungers which mechanically interlock with the vehicle gear selector and prevent movement of the gear selector from park or neutral into drive or reverse modes unless the vehicle brakes are applied. This ensures that the vehicle is attended by an operator and is in a safe operating mode when drive or reverse movement of the vehicle occurs.

However, the known transmission safety lock devices utilize a large number of separate parts which increases the cost of the safety lock device and makes installation more difficult. Furthermore, the number and complexity of the parts employed in such safety lock devices prevents their use on a large number of different transmissions without extensive and expensive modification of the vehicle transmission.

Thus, it would be desirable to provide a transmission safety lock device which prevent the shifting of a vehicle transmission from park or neutral into either drive or reverse unless the vehicle brakes are applied. It would also be desirable to provide a transmission safety lock device which is simple in construction and contains a small number of individual components. It would also be desirable to provide a transmission safety lock device which can easily be used with a large number of different transmissions and vehicles without excessive modification.

SUMMARY OF THE INVENTION

The present invention is a transmission safety locking lever apparatus which prevents a transmission in a vehicle from being shifted from park or neutral into either drive or reverse unless the vehicle brakes are applied.

The apparatus comprises first and second spaced apertures formed in the gear shift lever which is connected to a gear shift shaft coupled to the transmission and rotatable for selecting transmission operating modes and gear ratios upon movement of a gear selector means in the vehicle. A lock pin is movable between extended and retracted positions. Means for mounting the lock pin are provided such that the lock pin engages one of the first and second apertures in the gear shift lever when in the extended position and the gear shift lever and the gear shift shaft are in a position selecting either park or neutral transmission operating conditions. Actuator means are provided for retracting the lock pin out of engagement with the gear shift lever when activated. Means, responsive to a predetermined pressure at which the vehicle brakes are applied, connects the actuator means to an electric power source to activate the actuator means to retract the lock pin from engagement with the gear shift lever.

In a preferred embodiment, the gear shift lever is formed with an arcuate portion containing the first and second spaced apertures. Solid portions are formed in the arcuate portion of the gear shift lever between the first and second apertures. Such solid portions are engaged by the lock pin when the lock pin is in the extended position so as to enable the gear shift lever to be moved simultaneously with movement of the gear shift selector of the vehicle to park or neutral positions.

The actuator means preferably comprises an electromechanical solenoid having a core and coil. The lock pin is movably disposed within the core and coil and is magnetically attracted into the core and coil by the magnetic field induced in the core when an electric current is applied to the coil.

The sensor means preferably comprises a pressure switch mounted in the hydraulic fluid brake system of the vehicle and is configured for activation at a predetermined pressure signifying a high degree of brake application sufficient to bring the vehicle to a stopped position.

A vehicle start interrupt is also provided by means of a contact plate mounted on the lock pin and movable therewith. The contact plate spans two contacts and closes an electric circuit between an electric power source, such as the vehicle's battery, and the vehicle starter so as to enable the starter to be energized through the vehicle ignition switch only when the lock pin is fully engaged in one of the first and second apertures in the gear shift lever. This ensures that the vehicle is in a safe operating condition when started.

The transmission safety locking lever apparatus of the present invention provides safe operation of a vehicle by preventing the vehicle's transmission from being shifted into drive or reverse modes from either park or neutral unless the vehicle brakes are applied. The apparatus is simple in construction and contains a minimal number of separate components. This leads to a low manufacturing cost and, more importantly, enables the apparatus to be used with a large number of different transmission configurations. Further, the apparatus can be easily installed on most vehicles without significant modification.

BRIEF DESCRIPTION OF THE DRAWING

The various advantages, features and other uses of the present invention will become more apparent by referring to the following detailed description and drawing in which:

FIG. 1 is a partial, elevational view of a prior art vehicle transmission showing the gear shift shaft, gear shift lever and gear selector control rod;

FIG. 2 is a partial, elevational view of the transmission safety locking lever apparatus of the present invention employed on the transmission shown in FIG. 1;

FIG. 3 is an elevational view of the gear shift lever of the present invention;

FIG. 4 is a plan view showing the transmission safety locking lever of FIG. 2 mounted in one position on a transmission;

FIG. 5 is a cross-sectional view, showing the detailed construction and an alternate mounting position of the transmission safety locking lever apparatus; and FIG. 6 is a schematic diagram of the electric circuitry employed in the transmission safety locking lever apparatus of the present invention.

DESCRIPTION OF THE PREFERRED EMBODIMENTS

Throughout the following description and drawing, an identical reference number is used to refer to the same component shown in multiple figures of the drawing.

The present invention is a transmission safety locking lever device which locks a vehicle's transmission in either park or neutral positions and prevents shifting of the transmission to either drive or reverse positions unless the vehicle brakes are applied.

FIG. 1 depicts a conventional prior art vehicle transmission showing a transmission housing 1 which houses the vehicle transmission containing a plurality of gear sets selectable in various ratios to provide various operating modes, including park, reverse, neutral and drive (P, R, N and D). Such a transmission is preferably an automatic transmission and has a gear shift shaft 4 coupled to the transmission gears and extending outward from one side of the housing 1. A planar link or gear shift lever A2 is fixedly connected at one end to the gear shift shaft 4. The opposite end of the gear shift lever A2 is connected to a shift control rod 3 which is attached to the gear shift selector, not shown, mounted interiorly within the vehicle. As is conventional, movement of the gear shift selector to either park, reverse, or drive positions causes a corresponding movement of the control rod 3 which results in a rotation of the gear shift lever A2 and the gear shift shaft 4 to the various positions labeled D, N, R and P, as shown in FIG. 1. Rotation of the gear shift shaft 4 results in a selection of the appropriate gear ratio or gear set in the transmission to implement the drive, neutral, reverse or park modes of vehicle operation.

It will be understood that the present invention may be applied to any conventional vehicle transmission having any number of gears including transmissions having more than one forward drive mode, such as those conventionally referred to as $D_1$ and $D_2$ or D and LOW. Furthermore, the control rod 3 is illustrated by way of example only as forming one means for coupling the gear shift lever A2 to the gear shift selector mounted within the vehicle. Any linkage, cable or coupling mechanism may be employed to transmit movement of the gear shift selector to rotational movement of the gear shift lever A2.

Referring now to FIGS. 2-5, the transmission safety locking lever device of the present invention includes the gear shift lever 2. The gear shift lever 2 is connected at one end to the gear shift shaft 4 extending outward from the transmission housing 1 and is rotatable therewith to enable the gear shift shaft 4 to select one of the transmission operating modes labeled D, N, R and P. The gear shift lever 2 is formed with a planar portion extending from the connection end to the gear shift shaft 4 and an arcuate section integrally connected to the planar portion.

An aperture 3A is formed at one end of the arcuate section of the gear shift lever 2, as shown in FIG. 3, and receives one end of the gear selector control rod 3. This causes rotation of the gear shift lever 2 upon movement of the gear selector control rod 3 as described above.

First and second apertures 20 and 27 are formed in the arcuate portion of the lever 2. The apertures 20 and 27 are spaced apart in the arcuate section of the lever 2 and bounded by solid portions. The first aperture 20 corresponds to the park position labeled P; while the second aperture 27 corresponds to the neutral position labeled N of the transmission, as shown in FIG. 3. Additional positions corresponding to the reverse and drive modes of the transmission, labeled R and D, respectively, are provided adjacent the apertures 20 and 27 for reasons which will be discussed in greater detail below.

The transmission safety locking apparatus of the present invention further includes a slidable lock pin 6 which is retractable and extendable with respect to the gear shift lever 2. An actuator means is provided for retracting the lock pin 6 to the retracted position when activated. In the retracted position shown by reference number 6A in FIG. 5, the lock pin 6 is disengaged from the arcuate section of the lever 2 thereby enabling the gear shift lever 2 to be rotated so as to change the selection of the transmission gears upon movement of the gear shift selector.

Preferably, the actuator means comprises an electromechanical solenoid, one example of which is shown in FIG. 5. The electromechanical solenoid is formed of a magnetic core 24 surrounding an electric coil 5 wound in a plurality of turns. The coil 5 is wound within a bobbin 26 mounted interiorly within the core 24. A bore 28 is formed interiorly within the coil 5. Leads 12 and 13 connected to the end of the coil 5 extend outward from the coil 5 for connection to an electric circuit, described hereafter, for activating the actuator means.

The lock pin 6, which is formed of a magnetic material, is slidably disposed through the core 24 interiorly within the coil 5, as shown in FIG. 5. The application of an electric current to the coil 5 induces a magnetic field in the core 24 which magnetically attracts the lock pin 6 interiorly into the core 24 causing a retraction and disengagement of the lock pin 6 from the gear shift lever 2 and movement of the lock pin 6 to the retracted position shown by reference number 6A in FIG. 5.

A biasing means 15, preferably a coil spring, is mounted exteriorly about the bobbin 26 and engages a metallic plate 9 mounted on one end of the lock pin 6 to normally bias the plate 9 and the lock pin 6 to the extended position. The magnetic field induced in the core 24 when an electric current is applied to the coil 5 overcomes the bias of the spring 15 to enable the lock pin 6 to be retracted to the position 6A shown in FIG. 5. In this position, the metallic plate 9 assumes the retracted position shown by reference number 9A in FIG. 5.

It should be noted that the core 24 and coils may be mounted on the transmission housing 1 in any suitable position such that the lock pin 6 is positioned to engage one of the apertures 20 or 27 in the gear shift lever 2 when the transmission is in the corresponding park or neutral modes of operation. In such modes of operation, the gear shift lever 2 will be rotated to one of the positions shown in FIG. 2 such that the lock pin 6, normally biased to the extended position by the spring 15, will engage one of the apertures 20 or 27 locking the gear shift lever 2 from rotational movement.

FIG. 4 depicts one mounting position of the core 24 and coil 5 on the transmission housing 1 in which the lock pin 6 extends outward from the housing 1 to engage the lever 2. An alternate mounting position is shown in FIG. 5 in which the core 25 and coil 5 are mounted exteriorly of the lever 2 such that the lock pin 6 moves toward the housing 1 to engage the lever 2.

For added support, a guide plate 14 is connected to and extends outward from one end of the core 24. The guide plate 14 is spaced from the one end of the core 24 to form a channel 30 with the opposed end of the core 24. The gear shift lever 2 is pivotally movable within the channel 30. The guide plate 14 is engageable by the outer end of the lock pin 6 when the lock pin 6 is in the extended position to support the lock pin 6 and provide stability to lock the gear shift lever 2 in a fixed position.

The transmission safety locking lever apparatus of the present invention further includes means, responsive to a predetermined pressure at which the vehicle brakes are applied, for connecting the actuator means to an electric power source to activate the actuator means to retract the lock pin 6 from engagement with the gear shift lever 2. In a preferred embodiment, a brake pressure sensor means 32, as shown in FIG. 6, is mounted in the vehicle brake hydraulic system. The brake pressure sensor means 32 is in the form of a pressure switch which closes when a predetermined pressure is reached in the vehicle brake system evidencing a predetermined degree of activation of the vehicle brakes. Preferably, such a predetermined pressure and degree of activation of the vehicle brakes are such that the vehicle is stopped or nearly stopped to ensure safe operation of the vehicle. The brake pressure sensor means 32, as shown in FIG. 6, is connected in series with an ignition key switch 34 and an electric power source 36, such as the vehicle's battery. The pressure switch 32, the ignition switch 34 and the battery 36 are serially connected between ground and the coil 5 of the actuator means.

Thus, electric current is applied to the coil 5 to retract the lock pin 6 from engagement with the gear shift lever 2 only when a predetermined pressure indicating a certain degree of actuation of the vehicle brakes has been sensed by the pressure sensor 32 and the vehicle ignition switch 34 is on. Without the brakes being applied, the pressure sensor switch 32 will be open thereby preventing current from being applied to the coil 5. This causes the lock pin 6 to remain in its extended position under the bias of the spring 15.

In operation, it will be assumed that the vehicle brakes are not initially applied. The vehicle ignition is first activated as evidenced by a closure of the ignition switch 34 with the transmission is in a park position. At this time, no current is flowing through the coil 5 such that the actuator means is deactivated. The biasing spring 15 urges the lock pin 6 to its extended position, shown in FIG. 5, in which the lock pin 6 engages and passes through the aperture 20 in the gear shift lever 2 into the guide plate 14. This locks the gear shift lever 2 in a fixed position in the park mode of the transmission regardless of any force exerted on the gear shift selector to move the transmission to other positions.

When the vehicle brakes are applied with a sufficient amount of pressure, as evidenced by a closure of the pressure switch 32, current will be applied to the coil 5 inducing a magnetic field in the core 24 and magnetically attracting and retracting the lock pin 6 to position 6A into the core 24. This disengages the lock pin 6 from the aperture 20 in the gear shift lever 2 and enables the gear shift lever 2 and the transmission to be moved to any operating position including reverse, neutral or drive as desired by the operator of the vehicle through movement of the gear shift selector. This selection of a particular transmission operating mode is possible only as long as the vehicle brakes are applied with a predetermined amount of pressure which causes the pressure switch 32 to remain closed and electric current applied to the coil 5.

Whenever the vehicle brakes are released, the pressure switch 32 will open disrupting current flow to the coil 5 and deactivating the actuator means. This causes the lock pin 6 to move to its extended position under the influence of the biasing spring 15.

If a neutral position has been or is selected by the operator of the vehicle, the aperture 27 in the gear shift lever 2 will be aligned with the lock pin 6 such that the extension of the lock pin 6 by the biasing spring 15 will cause the lock pin 6 to engage the aperture 27 in the gear shift lever 2. Alternately, if the operator has selected either reverse or drive modes of operation, the extension of the lock pin 6 under the biasing spring 15 will cause the lock pin 6 to strike a solid portion, labeled R or D in FIG. 3, located adjacent to the apertures 20 and 27 in the gear shift lever 2. The gear shift lever 2, thus, is free to be moved to any other position since the lock pin 6 is not in a fixed engagement with one of the apertures 20 and 27. Thus, at any time, the operator of the vehicle can move the gear shift selector to select park or neutral positions causing rotation of the gear shift lever 2 and an engagement of the lock pin 6 with one of the apertures 20 and 27 in the gear shift lever.

The transmission safety locking lever apparatus of the present invention also includes a start interlock which prevents the vehicle's engine from being started until the transmission is in either a park or neutral position and the lock pin 6 is engaged with one of the apertures 20 and 27 in the gear shift lever 2 locking the gear shift lever 2 and the transmission in the park or neutral position.

The start interlock comprises a pair of contacts 10 and 11 which are mounted so as to be spanned and engaged with the contact plate 9 connected to the lock pin 6 when the lock pin 6 is in the extended position shown in FIG. 5. As shown in FIG. 6, the leads from the contacts 10 and 11 are serially connected with the ignition switch 34, the vehicle battery 36 and the vehicle engine starter 38. In this circuit, the engine starter 38 may be activated only when the lock pin 6 is engaged with one of the apertures 20 and 27 in the gear shift lever 2 which locks the transmission in a fixed position and prevents it from being shifted to another gear. This provides safe operation of the vehicle during starting which would prevent inadvertent movement of the vehicle if the vehicle was started and the transmission was not in either park or neutral position.

In summary, there has been disclosed a unique transmission safety locking lever device which prevents the transmission from being shifted from park or neutral into either drive or reverse unless the vehicle brakes are applied. This provides safe operation for the vehicle since operator action is required to positively move the transmission to forward or reverse modes of operation.

The transmission safety locking lever apparatus of the present invention is simple in construction and contains a minimal number of components for a low manufacturing cost. Further, the minimal number of components contribute to ease of installation and enable the transmission safety locking lever apparatus of the present invention to be used with many different transmission configurations without undue modification.

What is claimed is:

1. A safety locking lever apparatus for selectively locking a vehicle transmission in park or neutral modes of operation and permitting the transmission to be shifted to reverse or drive modes of operation through movement of a gear selector mounted in the vehicle and connected through a pivotally connected shift control rod and a gear shift lever to a gear shift shaft extending from the transmission and placing the transmission in the park, reverse, neutral and drive modes of operation when selectively advanced through a plurality of discrete positions only when the vehicle fluid pressure operated brakes are applied, the apparatus comprising:
   the gear shift lever including a first portion fixedly mounted on the gear shift shaft and a second, arcuate-shaped section integral with the first portion;
   first and second spaced apertures formed in the second arcuate-shaped section of the gear shift lever at equal radial distances from the connection of the first portion of the gear shift lever to the gear shift shaft;
   a lock pin movable between an extended position and a retracted position;
   means for biasing the lock pin to the extended position;
   actuator means for retracting the lock pin to the retracted position when activated;
   means for mounting the lock pin such that the lock pin is engageable, when in the extended position, with one of the first and second apertures in the gear shift lever when the gear shift lever and the gear shift shaft are in a position selecting one of the park and neutral transmission operating modes; and
   sensor means, responsive to a predetermined pressure at which the vehicle brakes are applied, for connecting the actuator means to an electric power source to activate the actuator means to retract the lock pin.

2. The apparatus of claim 1 wherein the biasing means comprises a coil spring.

3. The apparatus of claim 1 wherein the actuator means comprises:
   an electromagnetic solenoid formed of a core magnetically coupled to a coil formed of a plurality of turns of an electrical conductor; and
   the lock pin slidably disposed within the core and the coil and retracted into the core by the magnetic field induced in the core when an electric current is applied to the coil.

4. The apparatus of claim 1 wherein the sensor means comprises:
   a pressure switch responsive to a predetermined fluid pressure in the vehicle fluid pressure operated brakes.

5. The apparatus of claim 1 wherein:
   the second, arcuate-shaped section of the gear shift lever is solid adjacent the first and second apertures to prevent the lock pin from locking the gear shift lever from movement and preventing shifting of the transmission when the transmission is in one of the reverse and drive modes of operation.

6. A safety locking lever apparatus for selectively locking a vehicle transmission in park or neutral modes of operation and permitting the transmission to be shifted to reverse or drive modes of operation through movement of a gear selector mounted in the vehicle and connected through a gear shift lever to a gear shift shaft extending from the transmission and placing the transmission in the park, reverse, neutral and drive modes of operation when selectively advanced through a plurality of discrete positions only when the vehicle fluid pressure operated brakes are applied, the apparatus comprising:
   first and second spaced apertures formed in the gear shift lever;
   a lock pin movable between an extended position and a retracted position;
   means for biasing the lock pin to the extended position;
   actuator means for retracting the lock pin to the retracted position when activated;
   means for mounting the lock pin such that the lock pin is engageable, when in the extended position, with one of the first and second apertures in the gear shift lever when the gear shift lever and the gear shift shaft are in a position selecting one of the park and neutral transmission operating modes;
   sensor means, responsive to a predetermined pressure at which the vehicle brakes are applied, for connecting the actuator means to an electric power source to activate the actuator means to retract the lock pin;
   a contact plate carried by and movable with the lock pin;
   contact means mounted to be bridged by the contact plate when the lock pin is in the extended position engaging one of the first and second apertures in the gear shift lever; and
   ignition switch means, serially connected with the contact plate, the contact means and an electric power source, for selectively supplying electric power to energize an engine starter only when the lock pin extends into engagement with one of the first and second apertures in the gear shift lever.

7. A safety locking lever apparatus for selectively locking a vehicle transmission in park or neutral modes of operation and permitting the transmission to be shifted to reverse or drive modes of operation through movement of a gear selector mounted in the vehicle and connected through a pivotally connected shift control rod and a gear shift lever to a gear shift shaft extending from the transmission and placing the transmission in the park, reverse, neutral and drive modes of operation when selectively advanced through a plurality of discrete positions only when the vehicle fluid pressure operated brakes are applied, the apparatus comprising:

the gear shift lever having a first portion fixedly mounted on the gear shift shaft and a second, arcuate-shaped section integral with the first portion;

first and second spaced apertures formed in the second, arcuate-shaped section of the gear shift lever at equal radial distances from the connection of the first portion of the gear shift lever to the gear shift shaft;

a lock pin movable between an extended position and a retracted position;

means for biasing the lock pin to the extended position;

actuator means for retracting the lock pin to the retracted position when activated, the actuator means including:

an electromagnetic solenoid formed of a core magnetically coupled to a coil formed of a plurality of turns of an electrical conductor;

the lock pin slidably disposed within the core and coil and retracted into the core by the magnetic field induced in the core when an electric current is applied to the coil;

means for mounting the lock pin and the actuator means such that the lock pin is engageable, when in the extended position, with one of the first and second apertures in the gear shift lever when the gear shift lever and the gear shift shaft are in a position selecting one of the park and neutral transmission operating modes; and sensor means, responsive to a predetermined pressure at which the vehicle brakes are applied, for connecting the actuator means to an electric power source to activate the actuator means to retract the lock pin.

8. A safety locking apparatus for a vehicle having a transmission shiftable between park, reverse, neutral, and drive modes of operation, the apparatus comprising:

a gear shift shaft coupled to the transmission for selectively shifting the transmission between the park, reverse, neutral and drive modes of operation;

a gear shift lever fixedly mounted on the gear shift shaft;

gear selector means mounted in the vehicle and connected to the gear shift lever by a shift control rod for selecting one of the modes of operation of the transmission;

first and second spaced apertures formed in the gear shift lever at equal radial distances from the connection of the gear shift lever to the gear shift shaft;

a lock pin movable between an extended position and a retracted position;

means for biasing the lock pin to the extended position;

actuator means for retracting the lock pin to the retracted position when activated;

means for mounting the lock pin such that the lock pin is engageable, when in the extended position, with one of the first and second apertures in the gear shift lever when the gear shift lever and the gear shift shaft are in a position selecting one of the park and neutral transmission operating modes; and sensor means, responsive to a predetermined pressure at which the vehicle brakes are applied, for connecting the actuator means to an electric power source to activate the actuator means to retract the lock pin.

9. The apparatus of claim 8 wherein the gear shift lever comprises:

a first portion connected to the gear shift shaft; and a second, arcuate-shaped section integral with the first portion, the first and second apertures being formed in the second arcuate section.

10. The apparatus of claim 8 wherein the biasing means comprises a coil spring.

11. The apparatus of claim 8 wherein the actuator means comprises:

an electromagnetic solenoid formed of a core magnetically coupled to a coil formed of a plurality of turns of an electrical conductor; and the lock pin slidably disposed within the core and the coil and retracted into the core by the magnetic field induced in the core when an electric current is applied to the coil.

12. The apparatus of claim 8 wherein the sensor means comprises:

a pressure switch responsive to a predetermined fluid pressure in the vehicle fluid pressure operated brakes.

13. The apparatus of claim 9 wherein:

the second, arcuate-shaped section of the gear shift lever is solid adjacent the first and second apertures to prevent the lock pin from locking the gear shift lever from movement and preventing shifting of the transmission when the transmission is in one of the reverse and drive modes of operation.

14. A safety locking apparatus for a vehicle having a transmission shiftable between park, reverse, neutral, and drive modes of operation, the apparatus comprising:

a gear shift shaft coupled to the transmission for selectively shifting the transmission between the park, reverse, neutral and drive modes of operation;

a gear shift lever connected to the gear shift shaft;

gear selector means mounted in the vehicle and connected to the gear shift lever for selecting one of the modes of operation of the transmission;

first and second spaced apertures formed in the gear shift lever;

a lock pin movable between an extended position and a retracted position;

means for biasing the lock pin to the extended position;

actuator means for retracting the lock pin to the retracted position when activated;

means for mounting the lock pin such that the lock pin is engageable, when in the extended position, with one of the first and second apertures in the gear shift lever when the gear shift lever and the gear shift shaft are in a position selecting one of the park and neutral transmission operating modes;

sensor means, responsive to a predetermined pressure at which the vehicle brakes are applied, for connecting the actuator means to an electric power source to activate the actuator means to retract the lock pin;

a contact plate carried by and movable with the lock pin;

contact means mounted to be bridged by the contact plate when the lock pin is in the extended position engaging one of the first and second apertures in the gear shift lever; and ignition switch means, serially connected with the contact plate, the contact means and an electric power source, for selectively supplying electric power to energize an engine starter only when the lock pin extends into engagement with one of the first and second apertures in the gear shift lever.

* * * * *